July 19, 1960
W. L. TRICE
2,945,717
SEALING CONSTRUCTION FOR CASKETS
Filed Oct. 17, 1955
3 Sheets-Sheet 1
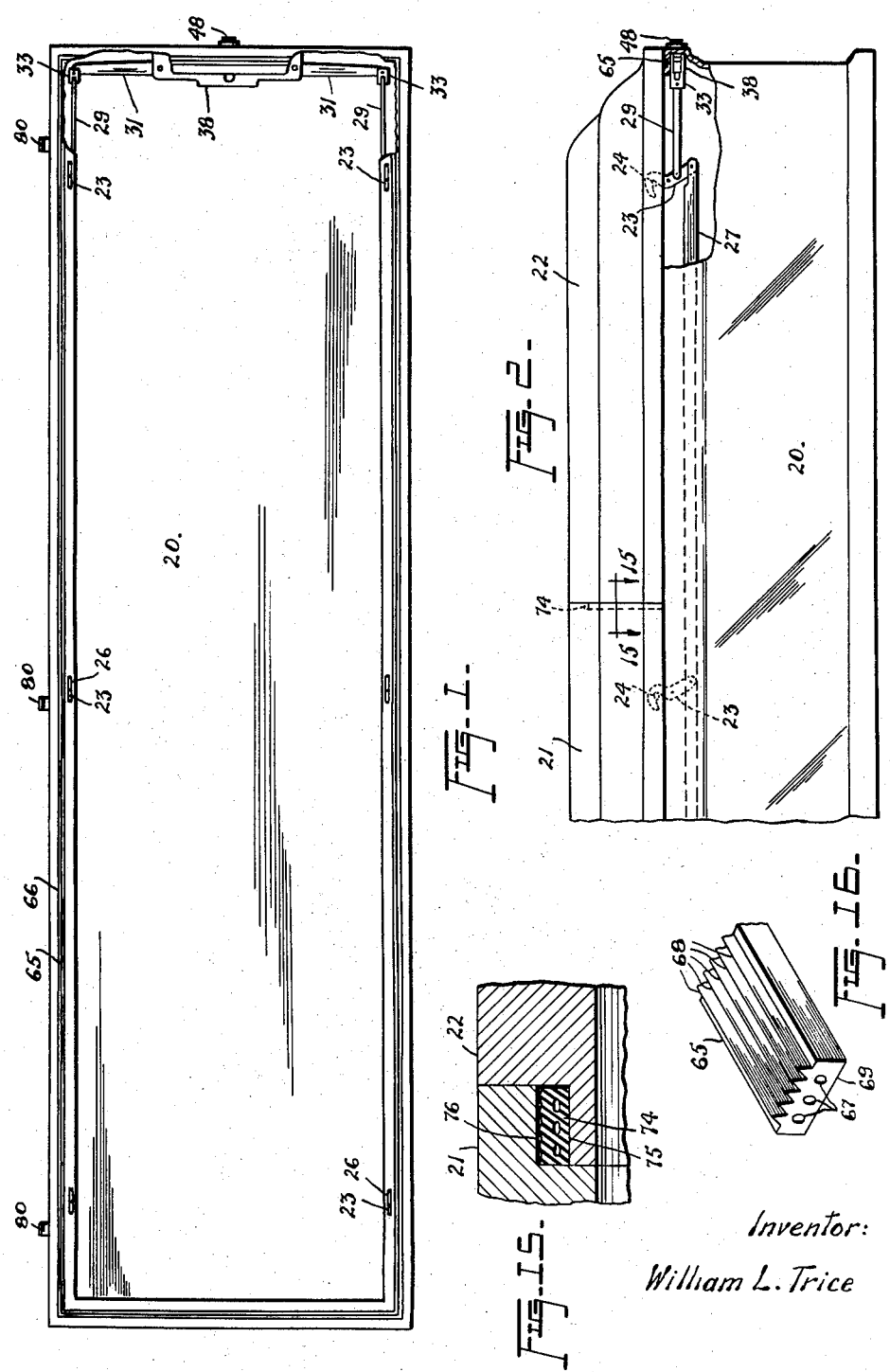
Inventor:
William L. Trice July 19, 1960 W. L. TRICE 2,945,717
SEALING CONSTRUCTION FOR CASKETS
Filed Oct. 17, 1955 3 Sheets-Sheet 2

Inventor:
William L. Trice

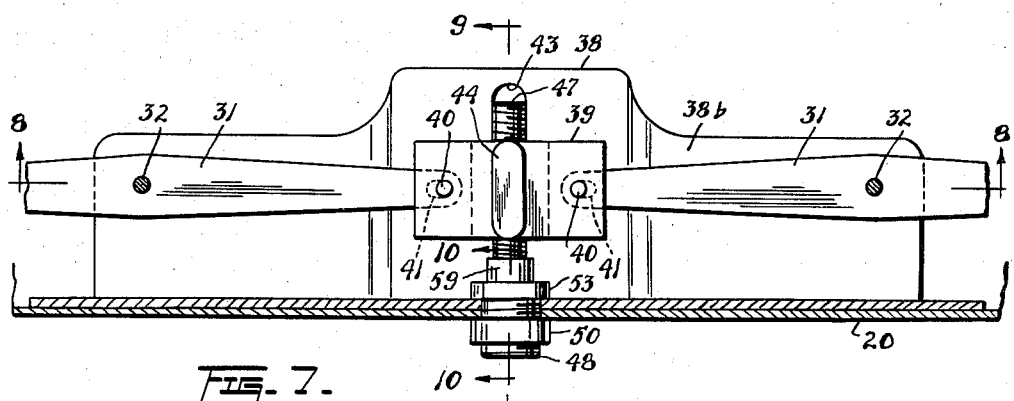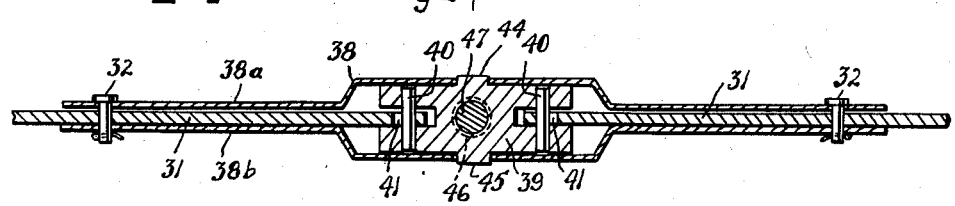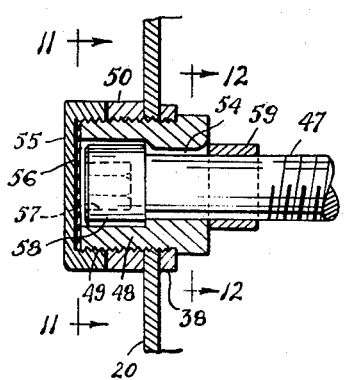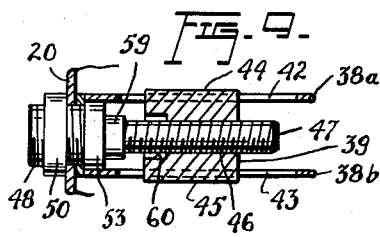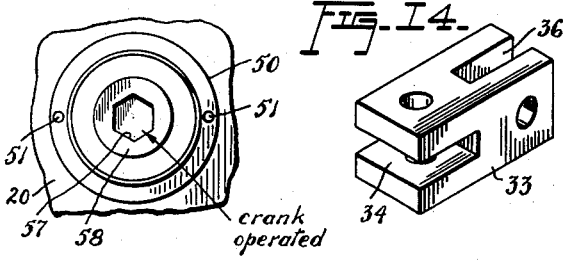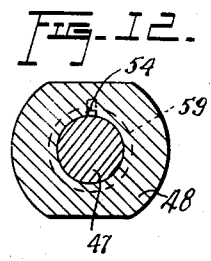

United States Patent Office 2,945,717
Patented July 19, 1960

2,945,717
SEALING CONSTRUCTION FOR CASKETS
William L. Trice, Waco, Tex., assignor to
Jim P. Wilkirson, Waco, Tex.
Filed Oct. 17, 1955, Ser. No. 540,972
1 Claim. (Cl. 292—26)

This invention relates to sealing construction for burial caskets.

For many years, undertakers and others in that field of activity have sought to provide seals for coffins and caskets, which at times must be shipped long distances carrying corpses. Excellent seals have been made of lead and similar metals, and extensive use has been made of rubber seals, tightened by numerous clamping screws or bolts. Most such constructions have not been entirely satisfactory, especially if the sealed casket has to be opened. There is a definite need for a sealing construction which will seal a casket perfectly, which will operate quickly, which may be readily unsealed as often as desired without deterioration of the seal, and which is not expensive, not mechanically elaborate, and does not detract from the beauty of a modern casket. These desiderata are realized by the construction which will be described and claimed below.

The inventive construction may be embodied in many different forms, but generally speaking it comprises a soft seal set in the top edges of the casket, at least one mating soft seal carried in the edges of the cap or caps (lids), a set of hinges connecting the cap or caps to the casket body and permitting sealing movement thereof when the cap or caps are locked, and a mechanism operated by hand power from outside the casket to cause a series of latches to engage (or disengage) keepers on the cap or caps, thereby to pull down, lock and seal said caps, the sealing movement of the caps being concomitant with compression of the mating soft seals.

In the accompanying drawings forming a part of this specification,

Fig. 1 is a top plan view, partly broken away, of a casket provided with the sealing construction of the invention, the cap or lid being omitted to show the contruction;

Fig. 2 is a front elevation, partly broken away, of a portion of a casket having two caps or lids and showing the caps locked;

Fig. 7 is a sectional plan view showing part of the lock-actuating mechanism mounted on an end wall of the casket;

Fig. 8 is a vertical section, being on line 8—8 of Fig. 7;

Fig. 9 is a vertical cross section, on line 9—9 of Fig. 7;

Fig. 10 is an enlarged section on line 10—10 of Fig. 7;

Fig. 11 is a fragmentary elevational view along line 11—11 of Fig. 10 with the screw cap removed;

Fig. 12 is a section on line 12—12 of Fig. 10;

Fig. 14 is a perspective view of the coupling that connects two levers of the lid-locking mechanism;

Fig. 15 is a section on line 15—15 of Fig. 2, but on a larger scale;

Fig. 16 is a perspective view of a small portion of the soft seal, shown full size;

Figure 3:
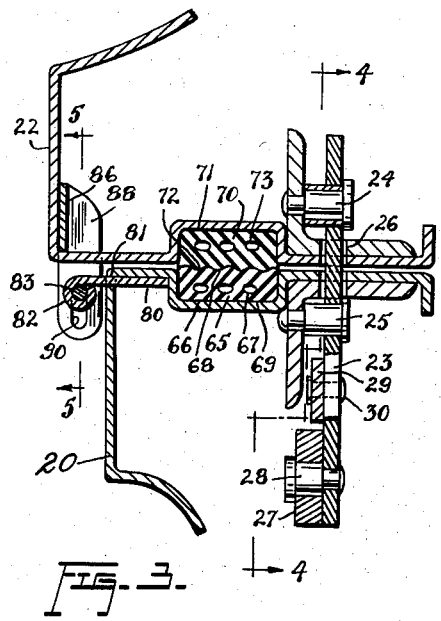
Fig. 3 is a vertical section through the cap, casket and hinge, showing the seal and the adjacent locking mechanism, the section being substantially on line 3—3 of Fig. 4.

Referring particularly to the drawings, Fig. 1 shows the body 20 of a casket, omitting the handles, caps, finish and other details having no bearing on the invention. Casket 20 may have a single cap (not shown) mounted thereon by at least three hinges, or it may have two caps 21, 22 each coupled by at least two hinges to be described. When there is a single cap, at least six latches 23 are provided, three at the front and three at the back, but with two caps, at least eight latches are used, four at the back (two for each cap) and four at the front. Keeper pins, which may be rollers on pins, indicated at 24 (Figs. 3 and 4) are set in the edges of the caps in such positions that they will be engaged by the latches to pull the caps down in the sealing movement previously mentioned. Latches 23 are housed in the casket body when not in use, are pivoted at intermediate points on pivot pins 25 fixed to body 20, and move vertically through narrow slots 26 (Fig. 1) cut in the edges of the casket into engagement with the keeper pins 24. For a better understanding of the latch mounting, reference may be made to the Wilkirson Patent No. 2,708,302, dated May 17, 1955. Also as disclosed in that patent, an independently operable latch mechanism (not shown) moved by a hand lever may lock the cap 22 at the foot of the casket even when the cap 21 at the head end is open for a "viewing" or a funeral service.

All the latches 23 at the back of the casket, also all at the front, are worked together by straight links 27 each having a pivot pin 28 connecting it to the lower end of the latch. Each latch is set at the same angle as all the others, so that all the latches close together and open together. The three or more latches at the back wall of the casket together with link 27 form a parallel motion linkage which is operated from the foot end of the casket by a mechanism which will now be described, the same mechanism simultaneously operating the parallel motion linkage on the front inside wall of the casket.

Pivotally connected to the latch 23 which is nearest the foot end of the casket is a straight link 29. Pin 30 makes the connection about midway between latch pivot 25 and pivot pin 28. There are of course two links 29, one adjacent the inside front wall of the casket, the other adjacent the inside rear wall, each longitudinally movable to operate the corresponding set of latches. Each link 29 is moved back and forth by a pivoted lever 31 swingable in a horizontal plane about a pin 32 as an axis. See Figs. 1, 7 and 8. A slotted connector 33 (Fig. 14) couples the outer end of each horizontally swinging lever 31 with the adjacent end of link 29. As shown, connector 33 has a horizontal slot 34 extending from one end inwardly and adapted to receive the outer end of horizontal lever 31, a cross pin 35 making the pivotal connection. At its opposite end, connector 33 has a vertical slot 36 extending inwardly and adapted to receive the end of vertical link 29, a cross pin 37 making the pivotal connection. Thus horizontal swinging of each lever 31 is transmitted through connector 33 to link 29, which is moved longitudinally back and forth to operate the latches as previously explained. In lieu of the connector 33 with its two pivot pins 35, 37, a rack and pinion-segment (not illustrated) may be used to transmit horizontal swinging of each lever 31 into longitudinal movement of the corresponding link 29.

Reference should now be made to Figs. 7—13. A casing 38 is welded to the inside wall at the foot of the casket to provide a support for the horizontally swinging levers 31 and a housing for a lever-operating nut 39. Casing 38 is in two like parts 38ᵃ, 38ᵇ spaced just far enough apart to permit free movement of the levers and nut. Pivot pins 40 connect slidable nut 39 with the inner ends of levers 31, and levers 31 have enlarged bores 41 receiving pins 40. Casing elements 38ᵃ, 38ᵇ have slots 42, 43 respectively extending horizontally at right angles to the inner wall of the casket, and nut 39 has lugs 44, 45 projecting outwardly from the top and bottom and slidably fitting slots 42, 43 respectively. Slots 42, 43 obviously guide the nut as it is moved back and forth and also serve to limit movement of the nut in each direction. Nut 39 has a tapped bore 46 for a left-hand screw 47 which extends through a brass bearing member 48 to the exterior of the end wall of the casket. Bearing member 48 has screw threads 49 and a brass nut 50 having spanner holes 51 (Fig. 11) is screwed on bearing member 48 to hold it against the casket wall.

Figure 17:
Fig. 17 is a plan view of a hand crank that may be used to operate the mechanism.
Figure 13:
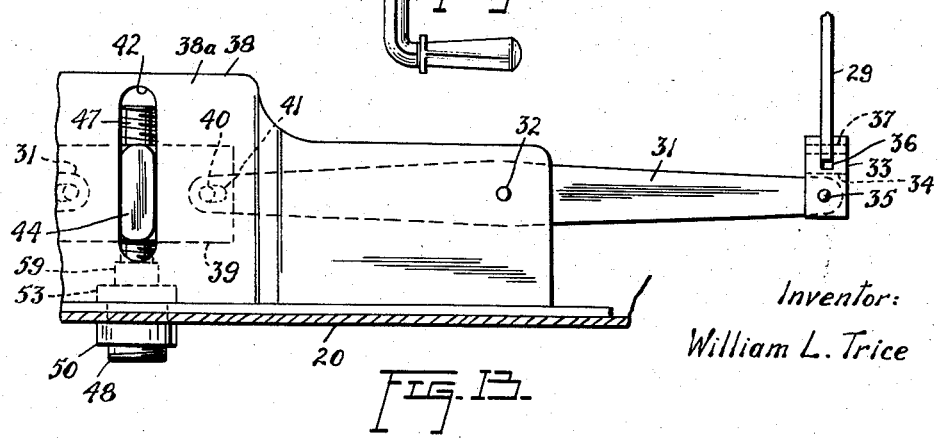
Fig. 13 is a fragmentary plan view of one end of the bracket shown in Fig. 7.

A groove 54 is cut in bearing member 48 to provide an air vent, and a brass screw cap 55 may be screwed over the outer end of bearing member 48 to give a finished appearance, and to provide a seal, a gasket 56 being inside screw cap 55 for this purpose. Screw cap 55 is removed when the casket is to be shipped by air, so that the air inside the casket may escape through vent 54 to prevent buckling of the sides of the casket under the changes in atmospheric pressure which occur when an airplane loaded at sea level rises to 18,000 feet or more. At other times, screw cap 55 will remain to enhance the appearance of the casket, being removed to operate the latching mechanism by means of a hand crank (not shown) having a hexagonal end fitting in a hexagonal socket 57 (Fig. 11) provided in the head 58 of the left hand screw 47. A thrust collar 59 is secured to the screw 47 and is received in a counter-bore 60 in nut 39 when the latter is in its extreme left position as the parts are viewed in Fig. 9. When the latches are being operated, the thrust collar 59 and the head 58 of screw 47 together transmit the reactions on the screw to the bearing member 48, thence to the casket wall. Vent 54 is enlarged as shown in Fig. 10 to obviate partial blocking of it by thrust collar 59. The screw-turning crank 95 (Fig. 17) is turned clockwise to rotate the left-hand screw 47 so as to move the latches 23 to locking position. Counterclockwise rotation of the crank will withdraw the latches and they will descend through slots 26 to lie below the plane of the top of the casket at the extreme limit of movement.

Figure 4:
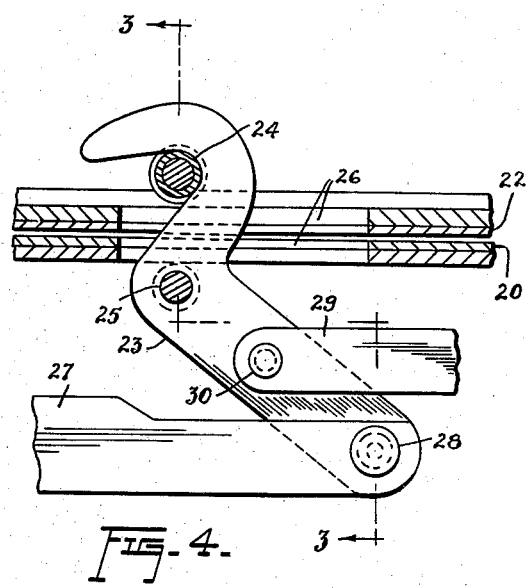
Fig. 4 is a section on line 4—4 of Fig. 3.

As shown in Fig. 1, there is a soft seal 65 of rubber-like plastic fitting in a groove 66 extending all the way around the top edge of the casket body. Referring to Figs. 3 and 16, it is seen that soft seal 65 has several air chambers 67 extending longitudinally of the seal, also several V-shaped ribs 68 likewise running lengthwise on one surface. The opposite seal surface 69 is plane to fit in the flat bottom of groove 66. Seal 65 engages a mating seal 70 of exactly the same dimensions, material and shape, but received in a groove 71 (Fig. 3) provided in the cap or caps 21, 22. The V-shaped ribs 72 on seal 70 intermesh with the ribs 68, and the air chambers 67 and 73 collapse somewhat under the pressure of the mechanism on the caps when latched. The seals may be each about 11/16 to 3/4 in. wide and about 3/8 to 5/16 in. in overall thickness (from the top of a rib to the under surface that contacts the bottom of the groove). Preferably three holes or air chambers are provided in each seal, and preferably each seal has five V-shaped ribs. The seals may be secured in their grooves by a plastic cement, not shown. When two caps are used (Figs. 2 and 15), one cap 22 may have a single seal 74 cemented to a longitudinally curved shoulder 75 extending the width of the cap from front to back, and the other cap 21 may have a complementary overhanging shoulder 76 contacting the ribbed surface of the seal; or if preferred two mating seals, exactly like seals 65 and 70, may be cemented to the respective caps to make a tight joint. Whenever there are two mating seals pressed together by the mechanism of the invention, both seals will be collapsed somewhat and the total compression or sealing movement will be about 1/8 in. when the seal dimensions are as stated above. This will insure a perfect seal all around, and a seal which may be "broken" or opened as many times as desired, without damage to the seal elements. As the two seals 65, 70 contact each other, not the finished metal of the casket or casket cap, there can be no marring of the casket finish by the seals when put under pressure. This is important to the casket manufacturer and to the mortician, both of whom display caskets with the cap open, which reveals any damage to the finish. As Fig. 3 shows, when the cap is closed, locked and tightened, the seals 65, 70 will still maintain the cap slightly spaced from the top edges of the casket.

Figure 5:
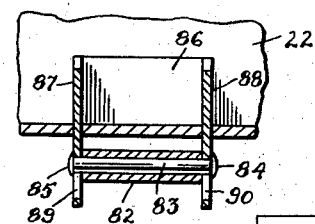
Fig. 5 is a section on line 5—5 of Fig. 3.
Figure 6:
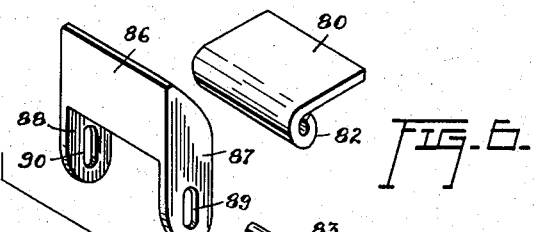
Fig. 6 is a perspective view of one of the cap hinges, shown "exploded"

As the cap or caps must be hinged, and as a hinge by its very nature will tend to prevent perfect sealing, since the hinge axis is much closer to the seal at the back edge of the casket than to the seal at the front edge, I have provided hinges which yield vertically about 1/8 in. as the cap or caps close and are latched and sealed. Referring to Figs. 3, 5 and 6, each hinge consists of a flat metal plate 80 welded to the top rear edge of the casket on the underside and extending through a slot 81 in the back wall of the casket and terminating in a curl 82 for receiving the hinge pintle 83. The pintle has a head 84 and an upset end 85 which is enlarged or upset after the parts are assembled. Another hinge plate 86 is welded to the cap on the inside and has integral flanges 87, 88 at right angles to its general plane, said flanges extending beyond the area of the main body of plate 86 and forming two parallel legs having elongated parallel slots 89, 90 respectively. It will be noted that the parallel legs extend outside the cap. The curl 82 will be received between the two parallel legs and the pintle 83 is passed through slot 89, through curl 82 and through slot 90 before having its end 85 upset as shown in Fig. 5 to secure the pintle in position. Elongated slots 89, 90 permit the hinge pintle to slide at least 3/16 in. vertically responsive to the reaction from closing and sealing the cap. When a cap is first closed, the mating seals 65, 70 will resist downward movement of the cap, and the hinge pintle 83 will be near the bottom of slots 89, 90, but as the latches pull the cap down, the seals 65, 70 partly collapse, and the hinge pintle rises to the top of slots 89, 90, as illustrated in Fig. 3. The slots 89, 90 insure that the cap will close evenly all around, and that the seal will be as perfect in the front as in the back. Without the slotted hinge flanges 87, 88 the cap will not be properly sealed even though the seals themselves are properly made and placed and all the parts are in good working order. In other words, a vertically yielding hinge must be used with soft seals that partly collapse responsive to vertical sealing pressure from the latches.

As the action of the parts has been described, a summary of the operation is believed to be unnecessary. Obviously many changes may be made in the parts, their construction, arrangement, design and positions. All such changes as are fairly within the scope of the appended claim I wish to cover as part of my invention.

What I claim is:

A latching mechanism suitable for caskets and the like comprising a set of latches pivoted to swing in a vertical plane and adapted to engage keepers on the casket cap; a link pivotally connected to each of said latches below their pivots and forming therewith a parallel motion linkage; another link pivotally connected at one end to one of the latches at a point between its pivot and its pivotal connection with the first named link; a lever one end of which is coupled to the other end of said other link so that when the lever swings it causes said set of latches to move in unison; means pivoting said lever at an intermediate point and supporting it on the foot wall of the casket; a screw; a screw support; a nut on the screw; a nut guide; pivotal means connecting the nut with the lever at the end thereof which is remote from said coupled end; and a hand crank for turning said screw to operate the set of latches.

References Cited in the file of this patent

UNITED STATES PATENTS

| | | |
|---|---|---|
| 1,426,776 | Riecken | Aug. 22, 1922 |
| 2,533,828 | McEwan | Dec. 12, 1950 |
| 2,552,641 | Morrison | May 15, 1951 |
| 2,708,302 | Wilkirson | May 17, 1955 |
| 2,736,076 | Bush et al. | Feb. 28, 1956 |